(12) United States Patent
Shiraishi (10) Patent No.: US 8,130,434 B2
(45) Date of Patent: Mar. 6, 2012

(54) OPTICAL BEAM SCANNING APPARATUS, OPTICAL BEAM SCANNING METHOD, IMAGE FORMING APPARATUS AND IMAGE FORMING METHOD

(75) Inventor: Takashi Shiraishi, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 615 days.

(21) Appl. No.: 12/207,455

(22) Filed: Sep. 9, 2008

(65) Prior Publication Data

US 2009/0067022 A1 Mar. 12, 2009

Related U.S. Application Data

(60) Provisional application No. 60/971,537, filed on Sep. 11, 2007.

(51) Int. Cl.
*G02B 26/08* (2006.01)

(52) U.S. Cl. ............... 359/204.1; 359/204.2; 359/204.4; 359/205.1

(58) Field of Classification Search .... 359/204.1–204.2, 359/204.4, 205.1; 347/241, 243, 256, 259–261
See application file for complete search history.

(56) References Cited

U.S. PATENT DOCUMENTS

2004/0184127 A1* 9/2004 Nakajima et al. ............. 359/204
* cited by examiner

*Primary Examiner* — James Phan
(74) *Attorney, Agent, or Firm* — Patterson & Sheridan, LLP (57) ABSTRACT

An optical beam scanning apparatus according to the present invention includes a pre-deflection optical system, a post-deflection optical system at least including one or plural first optical elements, plural second optical elements, a first reflection mirror which is provided in optical path between the first optical element and one of the second optical elements and reflects, on a most upstream side of the optical paths, a luminous flux on a most downstream side or a most upstream side in the sub-scanning direction among the plural luminous fluxes, and a second reflection mirror which is provided in optical path between the first optical element and another second optical element and reflects, on an optical path second from a most downstream side of the optical paths, the luminous flux on the most downstream side or the most upstream side in the sub-scanning direction among the plural luminous fluxes.

14 Claims, 8 Drawing Sheets

FOCUS POSITION ON FRONT SIDE IN SUB-SCANNING DIRECTION

OPTICAL BEAM SCANNING APPARATUS, OPTICAL BEAM SCANNING METHOD, IMAGE FORMING APPARATUS AND IMAGE FORMING METHOD

CROSS-REFERENCE TO RELATED APPLICATIONS

This application is based upon and claims the benefit of priority from: U.S. provisional application 60/971537, filed on Sep. 11, 2007, the entire contents of which is incorporated herein by reference.

TECHNICAL FIELD

The present invention relates to an optical beam scanning apparatus, an optical beam scanning method, an image forming apparatus including the optical beam scanning apparatus, and an image forming method. In particular, the invention relates to an optical beam scanning apparatus that can form plural scanning lines by separating one or plural luminous fluxes, which are emitted from one or plural light sources, in a sub-scanning direction for each of color components using deflection surfaces of a deflecting device and then, imaging the luminous fluxes by a post-deflection optical system and an image forming apparatus including the optical beam scanning apparatus.

BACKGROUND

In an image forming apparatuses of an electrophotographic system such as a laser printer, a digital copying machine, or a laser facsimile includes an optical beam scanning apparatus that forms an electrostatic latent image on a photoconductive drum by irradiating a laser beam (a luminous flux) on the surface of a photoconductive drum and scanning the laser beam.

Recently, besides a monochrome machine including a scanning optical system that uses a single light source, a tandem color machine is proposed. For the tandem color machine, a method of increasing the number of laser beams scanned at a time by providing plural light sources (laser diodes) in one laser unit (a multi-beam method) is proposed for the purpose of realizing an increase in speed of scanning on the surface of a photoconductive drum. In the multi-beam method, plural beams for each of color components (e.g., yellow, magenta, cyan, and black) emitted from the respective light sources are subjected to processing in a pre-deflection optical system and are changed to one beam and made incident on a polygon mirror. The beam deflected by the polygon mirror is, after passing through an fθ lens configuring a post-deflection optical system, separated into beams for each of the color components and irradiated on a photoconductive drum for each of the color components.

There is also proposed a color image forming apparatus including an optical beam scanning apparatus that forms plural scanning lines by separating one or plural luminous fluxes, which are emitted from one or plural light sources, for each of color components using plural deflection surfaces having different angles with respect to a rotation center axis of a deflecting device (a polygon mirror) and then, imaging the luminous fluxes by a post-deflection optical system. For example, according to JP-A-7-256926, there is known a technique for making plural beams incident on an identical surface of one polygon mirror, separating the beams in order of height in a sub-scanning direction after passing through one set of fθ lenses, and reflecting the separated beams.

Moreover, recently, there is also proposed an optical beam scanning apparatus in which an individual imaging lens is provided for each of color components in a post-deflection optical system in order to improve optical accuracy in a scanning optical system in the optical beam scanning apparatus. For example, according to JP-A-2003-5113, there is known a technique for making plural beams incident on an identical surface of one polygon mirror, separating the beams in order of height in a sub-scanning direction after passing through a shared fθ lens, making the separated beams incident on an individual fθ lens after reflecting the beams.

However, in the optical beam scanning apparatus in the past in which the individual imaging lens is provided for each of the color components in the post-deflection optical system, the beams separated in order of height in the sub-scanning direction after passing through the shared fθ lens are reflected in order from a beam on a downstream side in the sub-scanning direction with respect to respective photoconductive drums arranged at predetermined intervals in the sub-scanning direction. Reflection mirrors that fold plural beams emitted from the shared fθ lens are arranged further on an upstream side of optical paths for luminous fluxes further on the downstream side in the sub-scanning direction Therefore, it is difficult to reduce a size of the optical beam scanning apparatus.

SUMMARY

The present invention was devised in view of such circumstances and it is an object of the present invention to provide an optical beam scanning apparatus, a housing of which can be reduced in size even if a scanning optical system in which an individual imaging lens is provided for each of color components in a post-deflection optical system is adopted, and an image forming apparatus including the optical beam scanning apparatus.

In order to solve the problems, an optical beam scanning apparatus according to an aspect of the present invention includes a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to scan the luminous fluxes against a scanning object in the main scanning direction, and a post-deflection optical system configured to at least include one or plural first optical elements which act on the luminous fluxes for all color components, plural second optical elements which respectively act on the luminous fluxes for each of color components, a first reflection mirror which is provided in optical path between the first optical element and one of the second optical elements and reflects, on a most upstream side of the optical paths, a luminous flux on a most downstream side or a most upstream side in the sub-scanning direction among the plural luminous fluxes emitted from the first optical elements, and a second reflection mirror which is provided in optical path between the first optical element and another second optical element and reflects, on an optical path second from a most downstream side of the optical paths, the luminous flux on the most downstream side or the most upstream side in the sub-scanning direction among the plural luminous fluxes emitted from the first optical elements, imaging the luminous fluxes scanned by the light deflecting device on the scanning object.

In order to solves the problems, an optical beam scanning method according to another aspect of the present invention includes the steps of preparing an optical beam scanning apparatus including one or plural first optical element, plural second optical elements, first reflection mirror, and second reflection mirror, emitting one or plural luminous fluxes, forming the luminous fluxes emitted from the light source to image the luminous fluxes as a line image in a direction corresponding to a main scanning direction, scanning the luminous fluxes against a scanning object in the main scanning direction, at least, acting on the luminous fluxes for all color components by one or plural first optical elements, respectively acting on the luminous fluxes for each of color components, and imaging the scanned luminous fluxes on the scanning object, reflecting, on a most upstream side of the optical paths, a luminous flux on a most downstream side or a most upstream side in the sub-scanning direction among the plural luminous fluxes emitted from the first optical elements, by the first reflection mirror provided in optical path between the first optical element and one of the second optical elements, and reflecting, on an optical path second from a most downstream side of the optical paths, the luminous flux on the most downstream side or the most upstream side in the sub-scanning direction among the plural luminous fluxes emitted from the first optical elements, by the second reflection mirror provided in optical path between the first optical element and another second optical element.

In order to solves the problems, an image forming apparatus according to another aspect of the present invention is an image forming apparatus including an optical beam scanning apparatus, the optical beam scanning apparatus including a light source configured to emit one or plural luminous fluxes, a pre-deflection optical system configured to form the luminous fluxes emitted from the light source to image the luminous fluxes as a line image in a direction corresponding to a main scanning direction, a light deflecting device configured to scan the luminous fluxes against a scanning object in the main scanning direction, and a post-deflection optical system configured to at least include one or plural first optical elements which act on the luminous fluxes for all color components, plural second optical elements which respectively act on the luminous fluxes for each of color components, a first reflection mirror which is provided in optical path between the first optical element and one of the second optical elements and reflects, on a most upstream side of the optical paths, a luminous flux on a most downstream side or a most upstream side in the sub-scanning direction among the plural luminous fluxes emitted from the first optical elements, and a second reflection mirror which is provided in optical path between the first optical element and another second optical element and reflects, on an optical path second from a most downstream side of the optical paths, the luminous flux on the most downstream side or the most upstream side in the sub-scanning direction among the plural luminous fluxes emitted from the first optical elements, imaging the luminous fluxes scanned by the light deflecting device on the scanning object.

In order to solves the problems, an image forming method according to another aspect of the present invention includes the steps of preparing an optical beam scanning apparatus including one or plural first optical element, plural second optical elements, first reflection mirror, and second reflection mirror, emitting one or plural luminous fluxes, forming the luminous fluxes emitted from the light source to image the luminous fluxes as a line image in a direction corresponding to a main scanning direction, scanning the luminous fluxes against a scanning object in the main scanning direction, at least, acting on the luminous fluxes for all color components by one or plural first optical elements, respectively acting on the luminous fluxes for each of color components, and imaging the scanned luminous fluxes on the scanning object, reflecting, on a most upstream side of the optical paths, a luminous flux on a most downstream side or a most upstream side in the sub-scanning direction among the plural luminous fluxes emitted from the first optical elements, by the first reflection mirror provided in optical path between the first optical element and one of the second optical elements, and reflecting, on an optical path second from a most downstream side of the optical paths, the luminous flux on the most downstream side or the most upstream side in the sub-scanning direction among the plural luminous fluxes emitted from the first optical elements, by the second reflection mirror provided in optical path between the first optical element and another second optical element.

DESCRIPTION OF THEN DRAWINGS

In the accompanying drawings.

DETAILED DESCRIPTION

An embodiment of the present invention is explained below with reference to the accompanying drawings.

Figure 1:
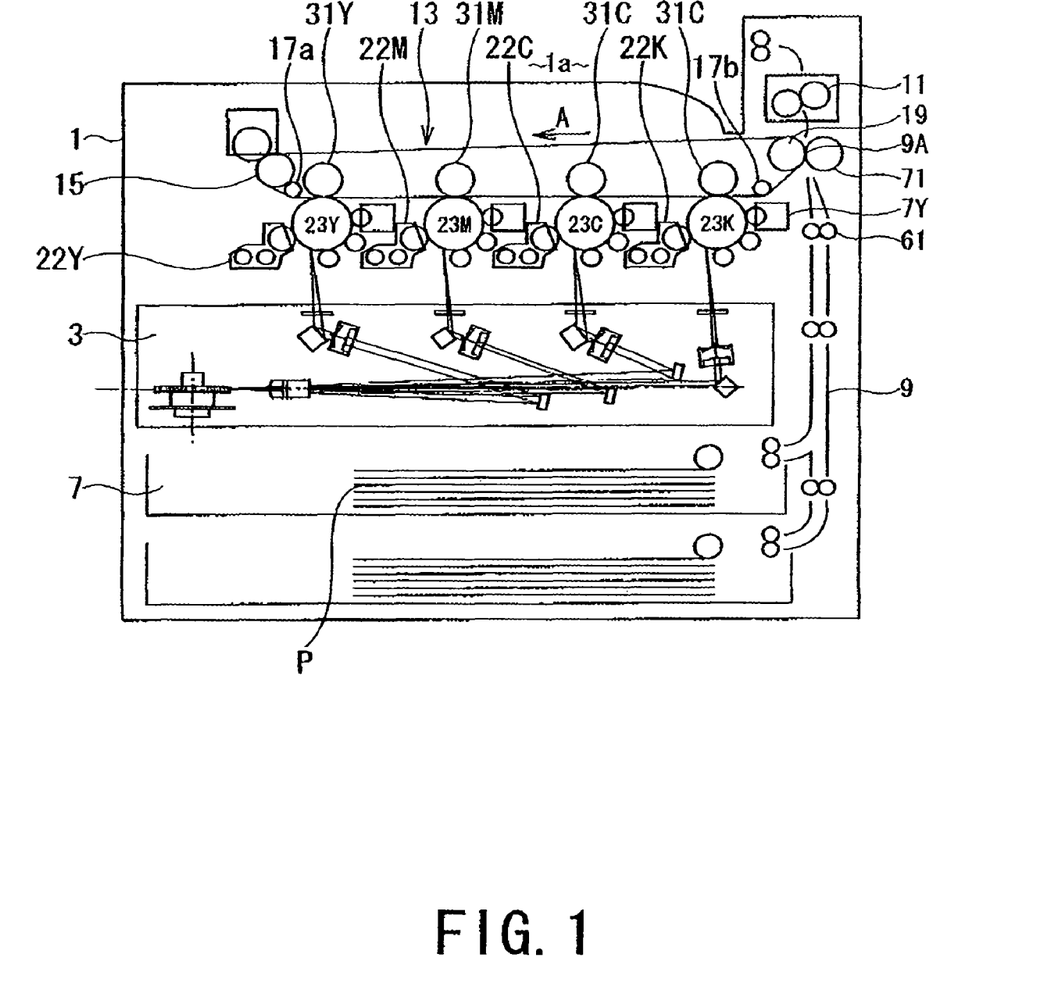
FIG. 1 is a side view showing a configuration of an image forming apparatus having an optical beam scanning apparatus to which the present invention is applied.

FIG. 1 is a diagram showing a configuration of an image forming apparatus 1 having an optical beam scanning apparatus 3 according to an embodiment of the present invention. In the explanation of this embodiment, the image forming apparatus 1 is applied to a color printer. However, the application of the image forming apparatus 1 is not limited to this. The image forming apparatus 1 can also be applied to various image output apparatuses such as a full-color copying apparatus, a facsimile apparatus, and a workstation apparatus.

The image forming apparatus 1 includes the optical beam scanning apparatus (an exposing apparatus) 3 that generates image light corresponding to an image signal and an image forming unit that transfers a toner image visualized by a toner as a developer onto paper P as a transfer medium used for output, which is called hard copy or printout, on the basis of the image light supplied by the optical beam scanning apparatus 3 and outputs the toner image. Every time the toner image is formed, the paper P is fed to the image forming unit from a paper holding unit 7 that holds an arbitrary number of sheet-like pieces of paper P having a predetermined size and can feed the pieces of paper P one by one according to timing when the toner image is formed in the image forming unit.

A conveying path 9 that guides the paper P from the paper holding unit 7 to the image forming unit is provided between the paper holding unit 7 and the image forming unit. The conveying path 9 guides the paper P to a fixing device 11 that fixes, on the paper P, the toner image transferred onto the paper P through a transfer device 9A that transfers the toner image formed in the image forming apparatus. As another function, the conveying path 9 guides the paper P having the toner image fixed thereon by the fixing device 11 to an image-output holding unit 1a also serving as a part of a cover that covers the image forming unit.

The image forming unit has an intermediate transfer belt 13 obtained by forming an insulative film having predetermined thickness in an endless belt shape. A belt obtained by forming metal in a thin sheet shape and then, protecting the surface thereof with resin may be applied as the intermediate transfer belt 13. Predetermined tension is applied to the intermediate transfer belt 13 by a driving roller 15, a first tension roller 17a and a second tension roller 17b, and a transfer roller 19. An arbitrary position of the intermediate transfer belt 13 parallel to an axis of the driving roller 15 moves in an arrow A direction when the driving roller 15 is rotated. In other words, a belt surface of the intermediate transfer belt 13 turns in one direction at speed of movement of an outer peripheral surface of the driving roller 15.

First to fourth image forming units 21Y, 21M, 21C, and 21K are arrayed at predetermined intervals in a section in which the belt surface of the intermediate transfer belt 13 moves substantially flat with the predetermined tension applied thereto by the respective rollers (the driving roller 15, the first tension roller 17a and the second tension roller 17b, and the transfer roller 19).

The first to fourth image forming units 21Y, 21M, 21C, and 21K respectively include at least developing devices 22Y, 22M, 22C, and 22K in which toners of arbitrary colors of Y (yellow), M (magenta), C (cyan), and BK (black) are stored and photoconductive drums 23Y, 23M, 23C, and 23K that hold electrostatic latent images developed by the respective developing devices 22 (the developing devices 22Y, 22M, 22C, and 22K). Electrostatic latent images corresponding to images of colors developed by the developing devices 22Y, 22M, 22C, and 22K provided in the respective image forming units 21 are formed, by image light from the optical light scanning apparatus 3, on the surfaces (outer peripheral surfaces) of the photoconductive drums 23Y, 23M, 23C, and 23K included in the respective image forming units 21. Consequently, the toners are selectively supplied by any one of the developing devices 22Y, 22M, 22C, and 22K corresponding to the electrostatic latent images. As a result, toner images of predetermined colors are formed on the photoconductive drums 23Y, 23M, 23C, and 23K, respectively.

In the first to fourth image forming units 21Y, 21M, 21C, and 21K, transfer rollers 31Y, 31M, 31C, and 31K for transferring the toner images held by the respective photoconductive drums 23 onto the intermediate transfer belt 13 are respectively provided in positions opposed to the photoconductive drums 23Y, 23M, 23C, and 23K via the intermediate transfer belt 13. The transfer rollers 31Y, 31M, 31C, and 31K are provided on a rear side of the intermediate transfer belt 13.

A not-shown image-signal supplying unit is provided in the image forming apparatus 1 in which the developing devices 22 (22Y, 22M, 22C, and 22K), the photoconductive drums 23 (23Y, 23M, 23C, and 23K), and the transfer rollers 31 (31Y, 311, 31C, and 31K) are arrayed as described above. The image-signal supplying unit supplies an image signal for each of color components to the optical beam scanning apparatus 3. The optical beam scanning apparatus 3 generates image light corresponding to the image signal supplied from the image-signal supplying unit and irradiates the generated image light on the surfaces of the photoconductive drums 23 (23Y, 23M, 23C, and 23K) integral with the developing devices 22 (22Y, 22M, 22C, and 22K) that holds the toners of the color components corresponding to the image light. At this point, the respective image forming units 21 form electrostatic latent images at predetermined timing such that the sequentially-transferred toner images are superimposed one on top of another on the intermediate transfer belt 13. The electrostatic latent images are developed (visualized) by the developing devices 22 corresponding to the image forming units 21.

The toner images formed on the photoconductive drums 23 of the respective image forming units 21 are transferred onto the intermediate transfer belt 13 by the transfer rollers 31 (31Y, 31M, 31C, and 31K) as primary transfer devices corresponding to the respective photoconductive drums 23 (23Y, 23M, 23C, and 23K). At this point, the toner images of Y, M, C, and BK are sequentially stacked on the intermediate transfer belt 13 that moves at predetermined speed. In the case of FIG. 1, roller bodies are used as the transfer rollers 31 which are primary transfer devices. However, the transfer rollers 31 are not limited to the roller bodies and may be voltage generating devices such as scorotrons.

A secondary transfer roller 71 as a secondary transfer device is provided in the image forming apparatus 1. The secondary transfer roller 71 comes into contact with the intermediate transfer belt 13 at predetermined pressure in a transfer position 9A of the conveying path 9. The secondary transfer roller 71 as the secondary transfer device transfers a full-color toner image formed on the intermediate transfer belt 13 onto the paper P guided to the transfer position 9A of the conveying path 9.

Registration rollers 61 that temporarily stop the paper P, which is guided from the paper holding unit 7 to the transfer position 9A, is provided in a predetermined position in the conveying path 9 between the paper holding unit 7 and the transfer position 9A. The registration rollers 61 include two rollers. At least one roller rotates in a predetermined direction and the other roller is pressed against one roller at predetermined pressure via a not-shown press-contact mechanism.

The paper P is guided through the conveying path 9 from the paper holding unit 7 to the transfer position 9A and temporarily stopped by the registration rollers 61. This makes it possible to correct a tilt (a tile of the paper P with respect to a conveying direction) that can occur during conveyance through the conveying path 9 from the paper holding unit 7 to the transfer position 9A.

According to timing when the registration roller 61 is rotated again, timing when a toner image carried to the transfer position 9A according to the movement of the belt surface of the intermediate transfer belt 13 reaches the transfer position 9A and timing when the paper P reaches the transfer position 9A are set. This makes it possible to arbitrarily set a position of the toner image with respect to the paper P and manage the position of the toner image with respect to the paper P.

Figure 2A:
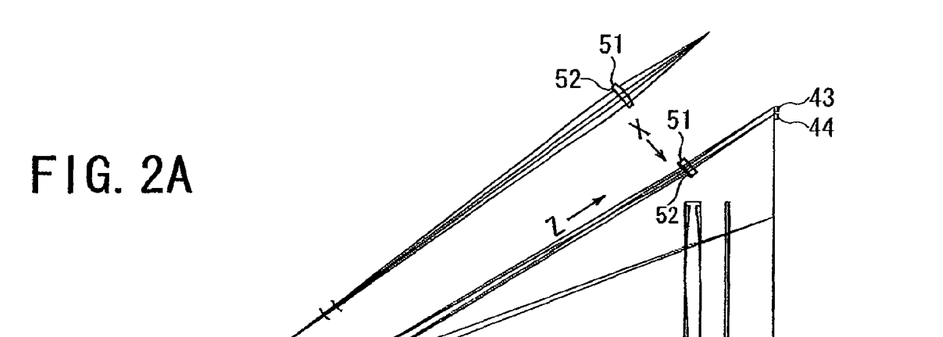
FIGS. 2A to 2C are diagrams showing expansion of reflecting by a reflection mirror provided in the optical beam scanning apparatus.
Figure 2B:
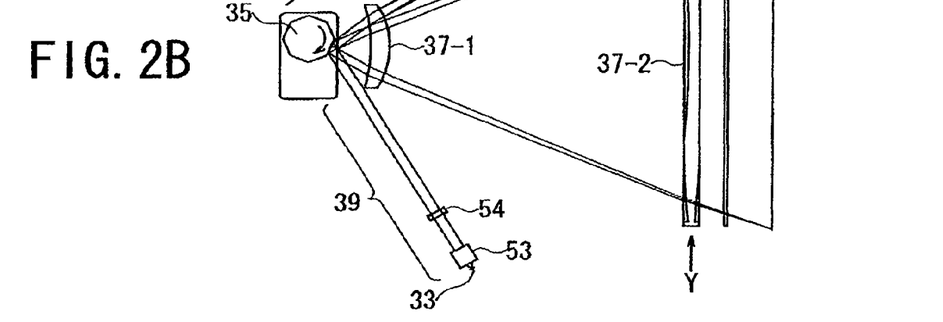
Figure 2C:
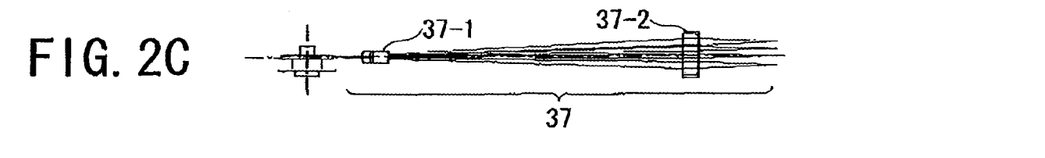

FIGS. 2A to 2C are diagrams showing expansion of reflecting by the reflection mirror provided in the optical beam scanning apparatus 3. FIG. 2A is a diagram which views FIG. 2B from an arrow X direction. FIG. 2C is a diagram which views FIG. 2B from an arrow Y direction. The optical beam scanning apparatus 3 includes, as shown in FIGS. 2A to 2C, at least a light source (a semiconductor laser) 33 that outputs image light (exposure light), a deflecting device 35 that scans the image light from the light source 33 in a raster direction for output (hard copy or printout) and guides a beam to the respective photoconductive drums 23 arranged at predetermined intervals in the sub-scanning direction, a post-deflection optical system (an image forming optical system) 37 that focuses the image light, which is raster-deflected (scanned) by the deflecting device 35, on the photoconductive drums 23 (23Y, 23M, 23C, and 23K) of the first to fourth image forming units 21 under a predetermined condition regardless of a deflection angle, and a pre-deflection optical system (an exposure light shaping optical system) 39 that guides the image light from the light source 33 to the deflecting device 35 under a predetermined condition.

A direction in which respective laser beams are deflected (scanned) by the deflecting device 35 (a rotation axis direction of the photoconductive drums 23) is defined as "main scanning direction" and a direction perpendicular to the optical axis of the optical system and the main scanning direction is defined as "sub-scanning direction". Therefore, the sub-scanning direction is a drum rotating direction on the photoconductive drum 23.

The deflecting device 35 includes a polygon mirror main body (a so-called polygon mirror) in which, for example, eight plane reflection surfaces (plane reflection mirrors) are arranged in a regular polygonal shape and a motor that rotates the polygon mirror main body in the main scanning direction at predetermined speed. The polygon mirror main body is a rotatable reflection element and is fixed to a shaft of the motor. The number of reflection surfaces provided in the polygon mirror main body as the reflection element and the number of revolutions are set according to requirements of output (i.e., resolution and output speed required of the image forming apparatus 1 and other requirements). The reflection surfaces (polygon mirror surfaces) of the deflecting device 35 have required angles with respect to a rotation center axis of the polygon mirror main body such that a beam can be guided to a scanning line position where electrostatic latent images are formed on the respective photoconductive drums 23.

The post-deflection optical system 37 includes at least a shared lens 37-1 used for all scanning lines for forming electrostatic latent images of the respective colors guided to the respective photoconductive drums 23 and an individual lens 37 corresponding to each of the scanning lines for forming electrostatic images of the respective colors guided to the respective photoconductive drums 23. The shared lens 37-1 gives different light focusing properties to the image light raster-scanned by the deflecting device 35 according to positions in a longitudinal direction of the respective photoconductive drums 23Y, 23M, 23C, and 23K (i.e., positions on the photoconductive drums 23 that depend on swing angles (deflection angles) of image light caused by raster deflection of the image light in the main scanning direction orthogonal to a direction in which the paper P is conveyed (a direction in which the photoconductive drums 23 are rotated)). The shared lens 37-1 has a slender shape extending in the longitudinal direction of the photoconductive drums 23.

The post-deflection optical system 37 includes, besides the shared lens 37-1 and the individual lens 37-2, various optical elements (e.g., a mirror and a filter) for guiding the image light raster-scanned by the deflecting device 35 to the respective photoconductive drums 23Y, 23M, 23C, and 23K of the first to fourth image forming units 21. The shared lens 37-1 and the individual lens 37-2 may be replaced with mirrors having curved surfaces similar to those of these lenses by optimizing types and shapes of optical elements and combining arrays. The replacement with mirrors may be applied to both the shared lens 37-1 and the individual lens 37-2 or may be applied to only one of the lenses.

A focus position (a focus position on a front side in the sub-scanning direction) of the shared lens 37-1 is set further on an upstream side (a side where the rotation center axis of the polygon mirror main body is present; the upstream side may extend beyond the rotation center axis) than the reflection surface (the polygon mirror surface) of the deflecting device 35 such that an inter-beam distance of beams emitted from the shared lens 37-1 for generating electrostatic latent images of the respective colors increases toward downstream of the optical paths.

The pre-deflection optical system 39 forms the image light from the light source 33 such that the image light is formed in (focused in) a sectional beam shape that satisfies a predetermined condition when the image light is raster-scanned by the deflecting device 35 and focused in predetermined positions in the longitudinal direction of the respective photoconductive drums 23Y, 23M, 23C, and 23K in the post-deflection optical system 37. The pre-deflection optical system 39 includes optical elements such as a condenser lens, a mirror, and an aperture.

Predetermined intervals corresponding to positions where the respective image forming units 21 are arrayed (substantially equal intervals on the belt surface of the intermediate transfer belt 13) are given to the image light emitted from the optical beam scanning apparatus 3. Intervals of the image light emitted from the optical beam scanning apparatus 3 are defined to integer times as large as a circumference (a rotation pitch of the driving roller 15) obtained by adding up the diameter of the driving roller 15 and the thickness of the intermediate transfer belt 13. Therefore, even if there is eccentricity or the like in the driving roller 15, since the same period is given when images are formed in the first to fourth image forming units 21, it is possible to reduce the influence of the eccentricity such as color drift.

Figure 3:
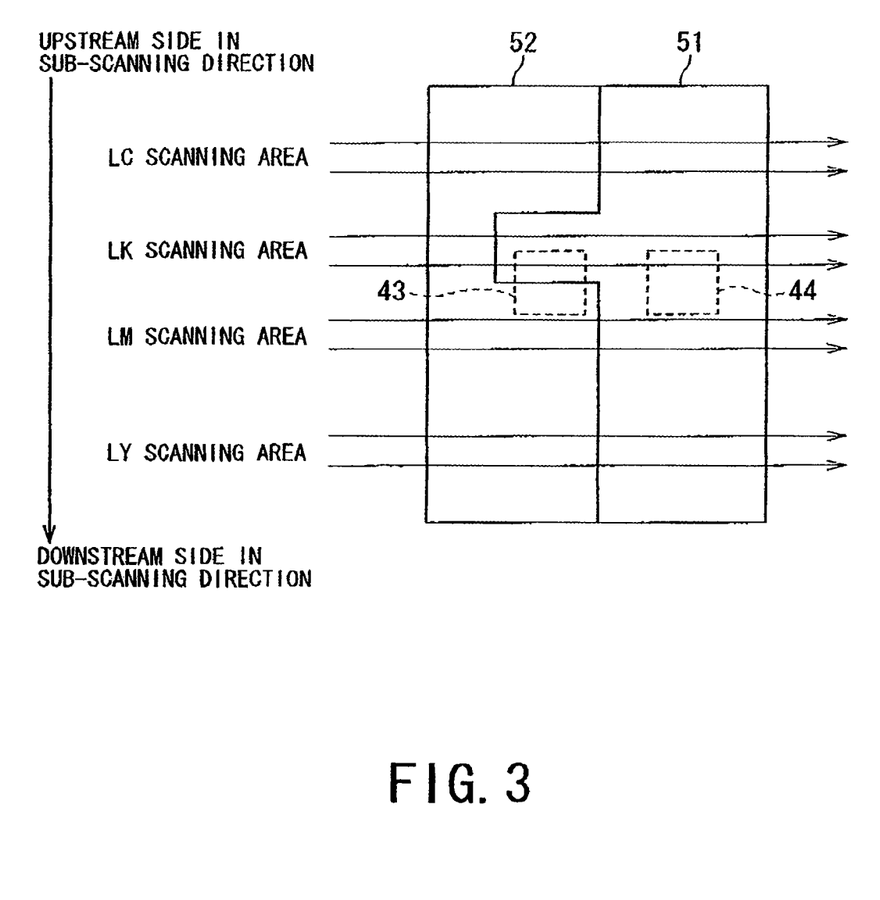
FIG. 3 is an explanatory diagram for explaining a shape of a light blocking plate that blocks optical paths of beams LY, LM, and LC to a surface discrimination sensor arranged on a downstream side of the optical path with respect to optical elements.

The scanning optical system of the optical beam scanning apparatus 3 includes a surface discrimination sensor 43 that outputs a signal only when the beam LK of BK (black) is scanned on the polygon mirror surface and a horizontal synchronizing sensor 44 for determining timing for drawing an image in the main scanning direction. A beam made incident on the horizontal synchronizing sensor 44 passes through the shared lens 37-1 and, then, passes through an optical element 51. The optical element 51 focuses beams passing through the different optical paths on the horizontal synchronizing sensor 44 in the sub-scanning direction while setting heights in the sub-scanning direction of all the optical paths substantially identical on the surface of the horizontal synchronizing sensor 44. The optical element 51 is a convex cylindrical lens on a surface on one side (a surface on the downstream side of the optical paths) thereof in this embodiment. A light blocking plate 52 is arranged on the upstream side of the optical path of the optical element 51. As shown in FIG. 3, the light blocking plate 52 has a shape for blocking the optical path of the beams LY, LM, and LC to the surface discrimination sensor 43 arranged on the downstream side of the optical paths with respect to the optical element 51. The light blocking plate 52 causes only the beam LK to pass through the surface discrimination sensor 43 via the optical element 51. In this embodiment, as shown in FIG. 3, the four beams LY, LM, LC, and LK emitted from the shared lens 37-1 after being deflected by the deflecting device 35 are arrayed in order of the beams LC, LK, LM, and LY from the upstream side in the sub-scanning direction to the downstream side in the sub-scanning direction. However, the array of the beams LC, LK, LM, and LY is not limited to this. The beans LC, LK, LM, and LY may be arrayed in order of the beams LY, LM, LK, and LC from the upstream side in the sub-scanning direction to the downstream side in the sub-scanning direction.

On the other hand, the light blocking plate 52 causes all the beams LY, LM, LC, and LK to pass through, via the optical element 51, the horizontal synchronizing sensor 44 arranged on the downstream side of the optical paths with respect to the optical element 51. This makes it possible to suitably adjust, while discriminating the black laser beam among the laser beams of the respective colors guided from the deflecting device 35 via the optical element 51, phases of the laser beams of the respective colors for each of the laser beams. Further, it is possible to prevent occurrence of color drift even in a situation in which there is an error in accuracy of an angle of the deflection surface of the deflecting device 35 and in which an error is likely to occur in rotating speed of the deflecting device 35. Moreover, it is possible to prevent occurrence of distortion in an image of a single color.

It goes without saying that the light blocking plate 52 may cause any one of the beams LY, LM, and LC to pass through the surface discrimination sensor 43 rather than causing only the beam LK to pass through the surface discrimination sensor 43. In this embodiment, the optical element 51 is provided in the optical paths between the optical element 37-1 that acts on the luminous fluxes deflected by all the deflection surfaces of the deflecting device 35 and the horizontal synchronizing sensor 44. However, the optical element 51 may be provided in the optical paths between the deflecting device 35 and the horizontal synchronizing sensor 44.

Figures 4A, 4B, 4C, 4D, 4E, 4F:
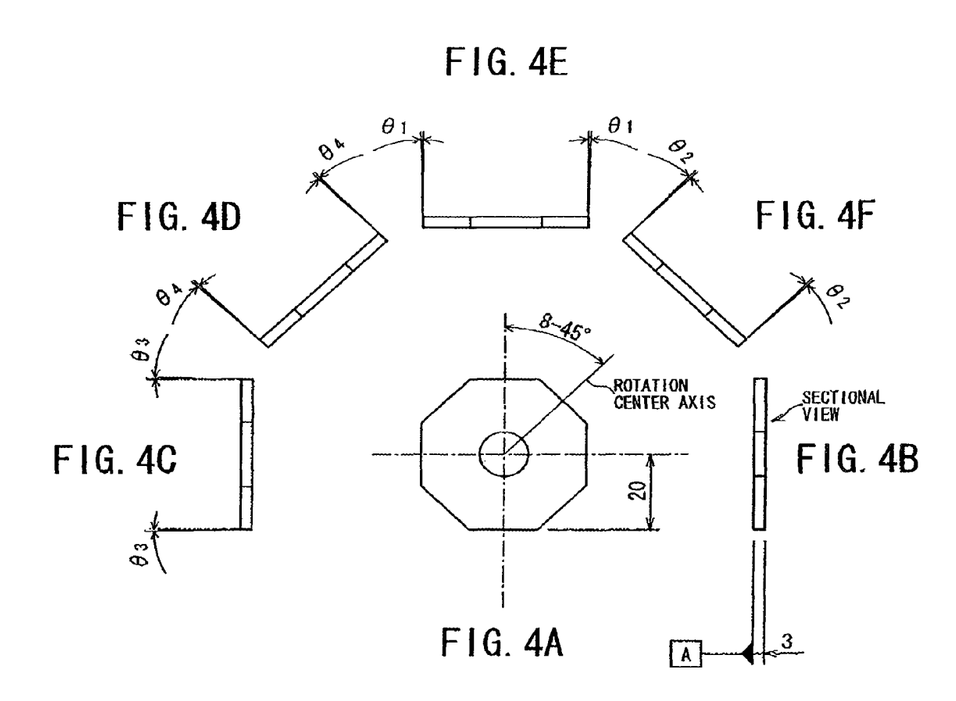
FIGS. 4A to 4F are a plan view, a sectional view, and side views of a polygon mirror main body of a deflecting device used in a scanning optical system of the optical beam scanning apparatus.

FIGS. 4A to 4F are a plan view, a sectional view, and side view of the polygon mirror main body of the deflecting device 35 used in the scanning optical system of the optical beam scanning apparatus 3. FIG. 4A is a plan view of the polygon mirror main body of the deflecting device 35. FIG. 4B is a sectional view of the polygon mirror main body of the deflecting device 35. FIGS. 4C to 4F are sides views of the polygon mirror main body of the deflecting device 35 viewed from a predetermined direction.

Figure 5:
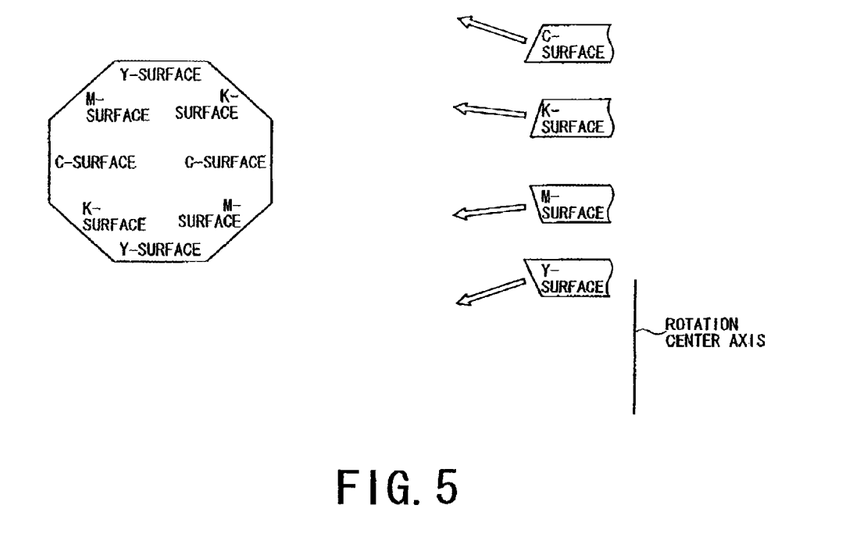
FIG. 5 is a diagram showing a state in which a reflection surface (Y surface) of the polygon mirror that reflects beam LY, LM, LC, and LK tilts in a direction closer to a rotation axis direction.

The sectional view of the polygon mirror main body of the deflecting device 35 shown in FIG. 4B shows a reference surface in setting a tilt of the reflection surfaces of the polygon mirror main body. A motor is provided on an A side of the reference surface via a not-shown shaft. As shown in FIGS. 4C to 4F, the reflection surfaces of the polygon mirror main body (the polygon mirror) have required tilts with respect to the rotation center axis (a rotation center axis of the motor, in other words, a hole center axis of the polygon mirror main body). Absolute values of the tilts of the reflection surfaces are maximum and equal at $\theta_1$ and $\theta_3$ and signs of the tilts are set opposite. The tilts have a relation of $\theta_1 = -\theta_3$ and have a relation of $\theta_1 > \theta_2 > \theta_4 > \theta_3$ or $\theta_1 < \theta_2 < \theta_4 < \theta_3$. For example, when a value of $\theta$ is a minus numerical value, this means that the reflection surface tilts in a direction closer to a rotation axis direction as the reflection surface is further away from the reference surface A. When a value of $\theta$ is a plus numerical value, this means that the reflection surface tilts in the direction closer to the rotation axis direction as the reflection surface is further away from a surface on the opposite side of the reference surface A. Specifically, for example, as shown in FIG. 5, the reflection surface (a C surface) that reflects the beam LC of the color component C and the reflection surface (K surface) that reflects the beam LK of the color component K tilt in the direction closer to the rotation axis direction as the reflection surfaces are further away from the surface on the reference surface A. The reflection surface (M surface) that reflects the beam LM of the color component M and the reflection surface (Y surface) that reflects the beam LY of the color component Y tilt in the direction away from the rotation axis direction as the reflection surfaces are further away from the reference surface A.

By arranging the reflection surfaces in this way, it is possible to control a maximum value of a tilt angle of the reflection surfaces of the polygon mirror main body to be as small as possible compared with other those in other arrangements. Since deterioration in a imaging characteristic increases as the tilts of the reflection surfaces of the polygon mirror main body increase, it is possible to suitably control the deterioration in the imaging characteristic.

Figure 6:
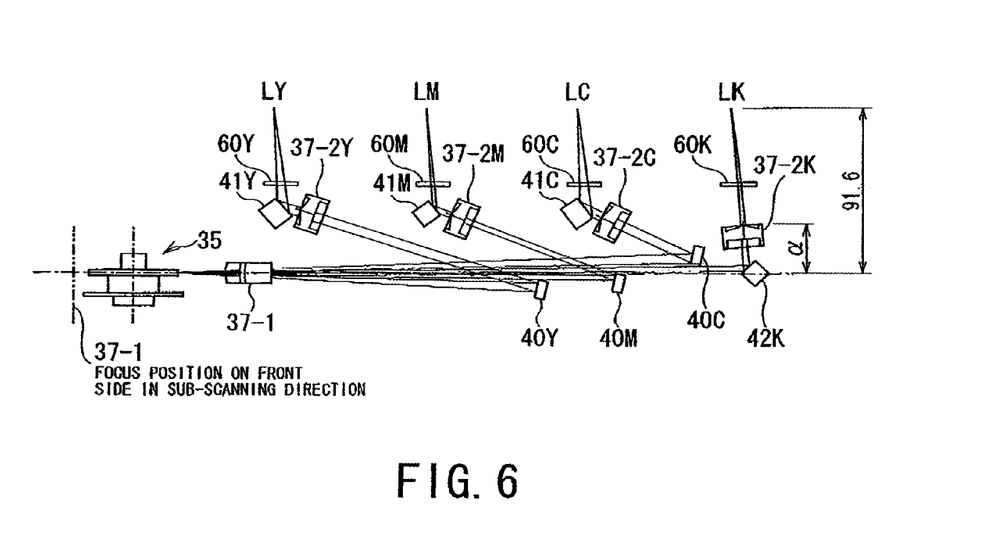
FIG. 6 is a diagram showing a detailed configuration of the optical beam scanning apparatus shown in FIG. 1.

In FIG. 6, optical paths for guiding beams to the respective photoconductive drums 23Y, 23M, 23C, and 23K using two reflection mirrors 40 and 41 for the three colors of Y, M, and C and using one reflection mirror 42 for one color of BK are shown. As described above, the focus position (the focus position on the front side in the sub-scanning direction) of the shared lens 37-1 is set further on the upstream side (the side where the rotation center axis of the polygon mirror main body is present; the upstream side may extend beyond the rotation center axis) than the reflection surface (the polygon mirror surface) of the deflecting device 35 such that an interbeam distance of beams emitted from the shared lens 37-1 for generating electrostatic latent images of the respective colors increases toward downstream of the optical paths. Consequently, beams further on the upstream side of the optical paths in reflection mirrors 40Y, 40M, 40C, and 42K for separating, for each of the color components, the beams raster-deflected by the deflecting device 35 have wider intervals in the same position in a beam traveling direction. The four reflection mirrors are arranged in order of the reflection mirrors 40Y, 40M, 40C, and 42K in order from the upstream side. The intervals in the same position in the beam traveling direction are in a relation of LY-LM>LM-LK>LK-LC.

In optical paths of beams reflected by the sets of the two reflection mirrors 40 and 41, individual lenses 37-2 (37-2Y, 37-2M, and 37-2C) are arranged between the sets of the two reflection mirrors 40 and 41, respectively. On the other hand, in an optical path of a beam reflected by the one reflection mirror 42K, an individual lens 37-2K is arranged after the reflection mirror 42K is arranged. In this embodiment, the beams LC and LY are beams at both-the ends in the sub-scanning direction. The beam LY at one end in the sub-scanning direction is reflected by the reflection mirror 40Y on the most upstream side. The beam LC at the other end in the sub-scanning direction is reflected by the reflection mirror 40C second from the most downstream side. The reflection mirror 40C is chamfered in advance not to block the optical path of the beam L.

Figure 7:
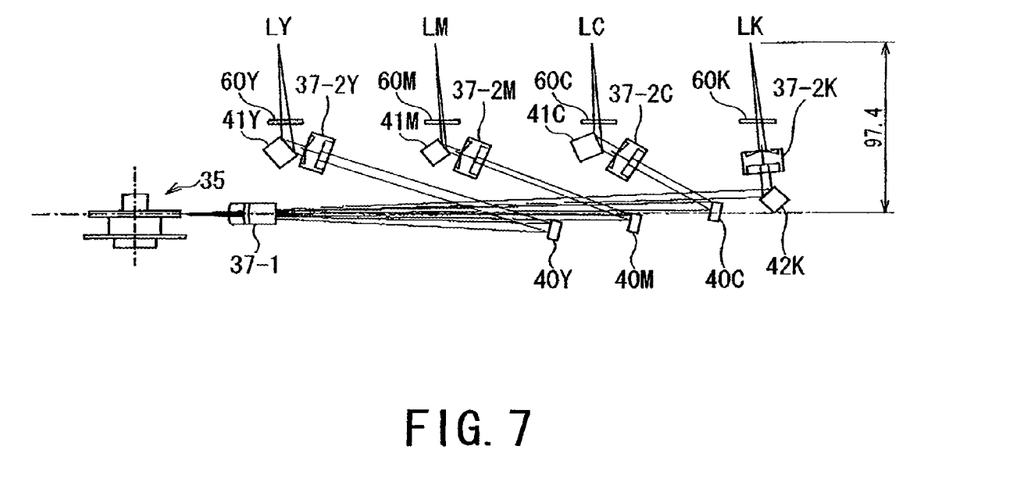
FIG. 7 is a diagram showing a detailed configuration of an optical beam scanning apparatus in the related art.

In FIG. 7, in the related art, optical paths for guiding beams to the respective photoconductive drums 23Y, 23M, and 23C using two reflection mirrors 40 and 41 for the three colors of Y, M, and C and using one reflection mirror 42 for one color of BK are shown. In this case, the four beams emitted from the shared lens 37-1 are reflected in order from the beam on the downstream side in the sub-scanning direction with respect to the respective photoconductive drums 23 arranged at the predetermined intervals in the sub-scanning direction. In other words, the four beams emitted from the shared lens 37-1 are reflected in order of the beam LY on the most downstream side in the sub-scanning direction, the beam LM on the downstream side in the sub-scanning direction next to the beam LY, the beam LC on the downstream side in the sub-scanning direction next to the beam LM, and the beam LK on the most upstream side in the sub-scanning direction. The reflection mirrors (the reflection mirrors 40Y, 40M, 40C, and 40K) that fold the four beams emitted from the shared lens 37-1 are arranged further on the upstream side of the optical paths for the beam further on the downstream side in the sub-scanning direction. In other words, the reflection mirror 40Y that reflects the beam LY on the most downstream side in the sub-scanning direction is arranged on the most upstream side of the optical paths. The other reflection mirrors are arranged to the downstream side of the optical paths in order of the reflection mirror 40M that reflects the beam LM on the downstream side in the sub-scanning direction next to the beam LY, the reflection mirror 40C that reflects the beam LC on the downstream side in the sub-scanning direction next to the beam LM, and the reflection mirror 42K that reflects the beam LK on the most upstream side in the sub-scanning direction. A distance α between the one reflection mirror 42 for one color of BK and the individual lens 37-2K is identical in both the optical path in the related art shown in FIG. 7 and the optical path in this embodiment shown in FIG. 6.

On the other hand, in this embodiment, as shown in FIG. 6, the four beams emitted from the shared lens 37-1 are reflected in order of the beams LY, LM, LK, and LC with respect to the respective photoconductive drums 23 arranged at the predetermined intervals in the sub-scanning direction. In other words, among the four beams emitted from the shared lens 37-1 in FIG. 7, the beam LC on the downstream side in the sub-scanning direction next to the beam LM and the beam LK on the most upstream side in the sub-scanning direction are interchanged in the order. The reflection mirrors (the reflection mirrors 40Y, 40M, 40C, and 42K) that fold the four beams emitted from the shared lens 37-1 are arranged as described below. The reflection mirror 40Y that reflects the beam LY on the most downstream side in the sub-scanning direction is arranged on the most upstream side of eh optical paths. The reflection mirror 40M that reflects the beam LM on the downstream side in the sub-scanning direction next to the beam LY is arranged second on the upstream side of the optical paths. The reflection mirror 40C that reflects the beam LC on the most upstream side in the sub-scanning direction is arranged third on the upstream side of the optical paths. The reflection mirror 42K that reflects the beam LK on the downstream side in the sub-scanning direction next to the beam LM is arranged on the most downstream side of the optical paths.

Figure 8:
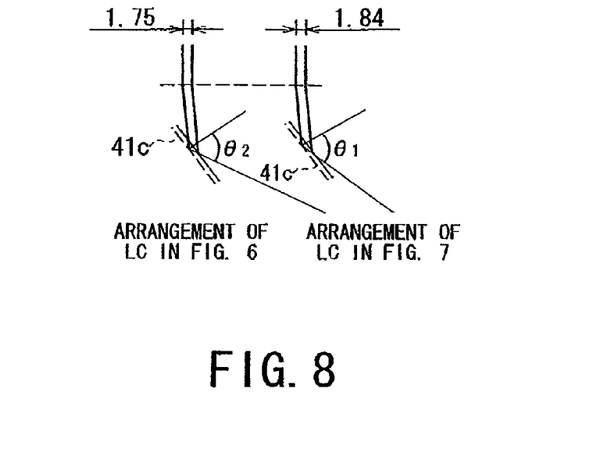
FIG. 8 is a diagram showing a state of suppressing scanning line curvature by setting an angle of incidence of the beam LC on the reflection mirror smaller than that in the related art.

In this embodiment, effects described below are realized by arranging the reflection mirrors as described above. First, it is possible to control the height of the optical beam scanning apparatus 3 and reduce a size of the optical beam scanning apparatus 3. Specifically, if a distance between cover glass 60 (a cover glass 60Y, 60M, and 60K) and the photoconductive drums is identical in both the optical path in the related art shown in FIG. 7 and the optical path in this embodiment shown in FIG. 6, in the case of the optical beam scanning apparatus 3 that uses the optical paths in the related art shown in FIG. 7, a distance from the image surface (the imaging surface) of the photoconductive drum 23 to the optical axis of the post-deflection optical system 37 is 97.4 mm. On the other hand, in the case of the optical beam scanning apparatus 3 according to this embodiment shown in FIG. 6, a distance from the image surface (the imaging surface) of the photoconductive drum 23 to the optical axis of the post-deflection optical system 37 is 91.6 mm. Therefore, in the optical beam scanning apparatus 3 according to this embodiment, the height of the optical beam scanning apparatus 3 can be reduced by 5.8 mm (about 6%) from that in the related art. A height dimension of a housing of the image forming apparatus 1 can be reduced by 5.8 mm from that in the related art. Second, an angle of incidence of a beam on the reflection mirror 41 provided on the downstream side of the individual lens 37-2C can be set small. Therefore, it is possible to reduce the bend of the scanning lines due to distortion of the reflection mirror 41C compared to that in the related art. Specifically, as shown in FIG. 8, when an angle of incidence of a beam on the reflection mirror 41C is $\theta_1$ and the distortion between the center in the main scanning direction and the end in the main scanning direction on the reflection surface of the reflection mirror 41C is, for example, 1 mm in the case of the optical beam scanning apparatus 3 that uses the optical paths in the related art shown in FIG. 7, a beam position on the image surface of the photoconductive drum 23 shifts by 1.84. On the other hand, when an angle of incidence of a beam on the reflection mirror 41C is $\theta_2$ ($\theta_1 > \theta_2$) and the distortion between the center in the main scanning direction and the end in the main scanning direction on the reflection surface of the reflection mirror 41C is, for example, 1 mm in the case of the optical beam scanning apparatus 3 according to this embodiment shown in FIG. 6, a beam position on the image surface of the photoconductive drum 23 shifts by 1.75. Therefore, in the optical beam scanning apparatus 3 according to this embodiment, the bend of the scanning lines due to the distortion of the reflection mirror 41C can be reduced compared to that in the past.

Figure 9:
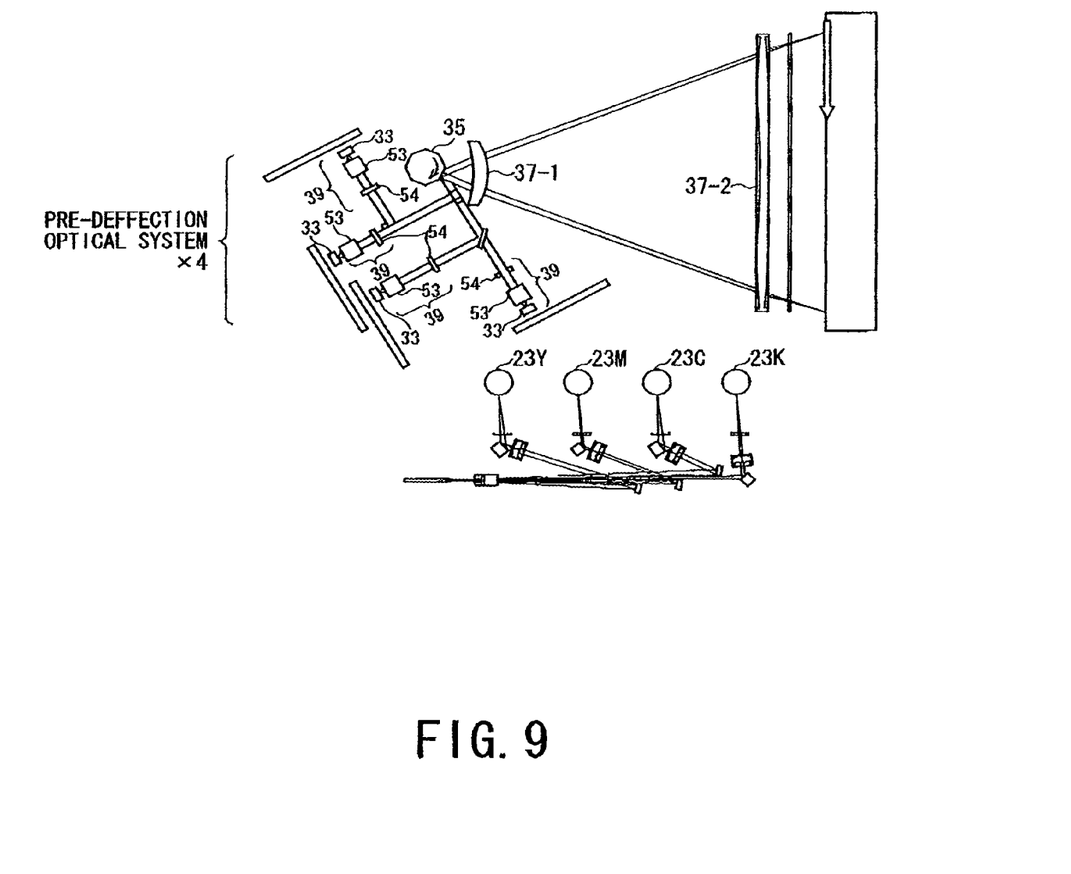
FIG. 9 is a diagram showing a scanning optical system which has plural pre-deflection optical system and forms plural scanning lines by deflecting respective luminous fluxes emitted from respective light sources, using deflection surfaces parallel to a rotation center axis of the deflecting device and then, imaging the luminous fluxes by a post-deflection optical system.
Figures 10A, 10B, 10C, 10D:
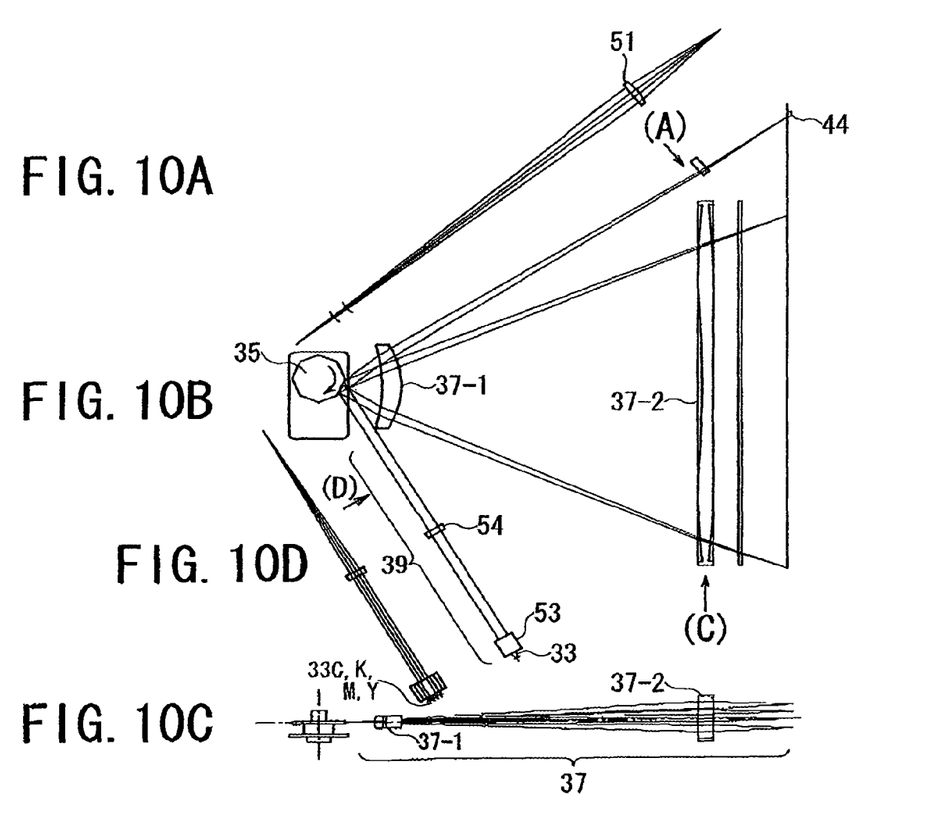
FIGS. 10A to 10D are diagrams showing a scanning optical system which has plural pre-deflection optical system, while substantially focusing all luminous fluxes on one deflection surface by a cylindrical lens, forms plural scanning lines by deflecting respective luminous fluxes emitted from respective light sources, using deflection surfaces parallel to a rotation center axis of the deflecting device and then, imaging the luminous fluxes by a post-deflection optical system.

In this embodiment, the optical beam scanning apparatus 3 explicitly described above includes one pre-deflection optical system 39 and forms plural scanning lines by separating one or plural luminous fluxes, which are emitted from one light source 33, in the sub-scanning direction for each of the color component's using the plural deflection surfaces of the deflecting device 35 and then, imaging the luminous fluxes with the post-deflection optical system 37 The optical beam scanning apparatus 3 is not limited to this. For example, as shown in FIG. 9, the optical beam scanning apparatus 3 may include plural pre-deflection optical systems 39 and form plural scanning lines by deflecting luminous fluxes, which are emitted from the respective light sources 33, using deflection surfaces having predetermined angles with respect to a rotation center axis of the deflecting device 35 and, then, imaging the luminous fluxes with the post-deflection optical system 37. Even with such an optical beam scanning apparatus 3, it is possible to realize the effects described above if a beam traveling into an optical path in which two post-deflection reflection mirrors are provided and a beam traveling into an optical path in which one post-deflection reflection mirror is provided are present in a scanning optical system.

Furthermore, as shown in FIGS. 10A to 10D, a scanning optical system which substantially focusing all luminous fluxes on one deflection surface by a cylindrical lens 54 may be used as long as a beam traveling into an optical path in which two post-deflection reflection mirrors are provided and a beam traveling into an optical path in which one post-deflection reflection mirror is provided are present in a scanning optical system. As a result, the above-mentioned effects similarly can be obtained.

What is claimed is:

1. An optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction; and
a post-deflection optical system for imaging the luminous fluxes scanned by the light deflecting device on the scanning object and configured to at least include one or plural first optical elements which act on the luminous fluxes for all color components, plural second optical elements which respectively act on the luminous fluxes for each of color components, a first reflection mirror which is provided in an optical path between the first optical element and one of the second optical elements and reflects, on a most upstream side of optical paths between the first optical element and second optical elements, a luminous flux on a most downstream side or a most upstream side in a sub-scanning direction among the plural luminous fluxes acted on by the first optical element, and a second reflection mirror which is provided in an optical path between the first optical element and another second optical element and reflects, second from a most downstream side of the optical paths, the luminous flux on the most downstream side or the most upstream side in the sub-scanning direction among the plural luminous fluxes acted on by the first optical element.

2. The optical beam scanning apparatus according to claim 1, wherein intervals of the optical paths of the luminous fluxes increase in the sub-scanning direction toward downstream of the optical paths.

3. The optical beam scanning apparatus according to claim 1, wherein the deflection surfaces provided in the light deflecting device have different angles with respect to the rotation center axis for each of the color components.

4. The optical beam scanning apparatus according to claim 1, wherein
one set of two reflection mirrors and only one reflection mirror are provided in the post-deflection optical system according to the color components,
at least the first reflection mirror and another reflection mirror forming a pair with the first reflection mirror are the set of two reflection mirrors, and
the second reflection mirror and another reflection mirror forming a pair with the second reflection mirror are the set of two reflection mirrors.

5. The optical beam scanning apparatus according to claim 4, wherein, when the set of two reflection mirrors are provided, the second optical element is provided in optical path between the two reflection mirrors and, when the only one reflection mirror is provided, the second optical element is provided on the downstream side of an optical path of the reflection mirror.

6. The optical beam scanning apparatus according to claim 1, wherein, in the post-deflection optical system, a third reflection mirror which reflects, second on the upstream side of the optical paths, a luminous flux second on the downstream side in the sub-scanning direction or on the upstream side in the sub-scanning direction among the plural luminous fluxes acted on by the first optical element is provided in the optical path between the first optical element and another second optical element and a fourth reflection mirror which reflects, on the most downstream side of the optical paths, a luminous flux third on the upstream side in the sub-scanning direction or the upstream side in the sub-scanning direction among the plural luminous fluxes acted on by the first optical element is provided in the optical paths between the first optical element and another second optical element.

7. The optical beam scanning apparatus according to claim 6, wherein
a set of two reflection mirrors and only one reflection mirrors are provided in the post-deflection optical system in accordance with the color components, and
the fourth reflection mirror is the only one reflection mirror.

8. An image forming apparatus having an optical beam scanning apparatus, an optical beam scanning apparatus comprising:
a light source configured to emit one or plural luminous fluxes;
a pre-deflection optical system configured to form the luminous fluxes emitted from the light source to image the luminous fluxes as a line image in a direction corresponding to a main scanning direction;
a light deflecting device configured to scan the luminous fluxes against a scanning object in the main scanning direction; and
a post-deflection optical system for imaging the luminous fluxes scanned by the light deflecting device on the scanning object and configured to at least include one or plural first optical elements which act on the luminous fluxes for all color components, plural second optical elements which respectively act on the luminous fluxes for each of color components, a first reflection mirror which is provided in an optical path between the first optical element and one of the second optical elements and reflects, on a most upstream side of optical paths between the first optical element and second optical elements, a luminous flux on a most downstream side or a most upstream side in a sub-scanning direction among the plural luminous fluxes acted on by the first optical element, and a second reflection mirror which is provided in optical path between the first optical element and another second optical element and reflects, second from a most downstream side of the optical paths, the luminous flux on the most downstream side or the most upstream side in the sub-scanning direction among the plural luminous fluxes acted on by the first optical element.

9. The image forming apparatus according to claim 8, wherein intervals of the optical paths of the luminous fluxes increase in the sub-scanning direction toward downstream of the optical paths.

10. The image forming apparatus according to claim 8, wherein the deflection surfaces provided in the light deflecting device have different angles with respect to the rotation center axis for each of the color components.

11. The image forming apparatus according to claim 8, wherein
one set of two reflection mirrors and only one reflection mirror are provided in the post-deflection optical system according to the color components,
at least the first reflection mirror and another reflection mirror forming a pair with the first reflection mirror are the set of two reflection mirrors, and the second reflection mirror and another reflection mirror forming a pair with the second reflection mirror are the set of two reflection mirrors.

12. The image forming apparatus according to claim 11, wherein, when the set of two reflection mirrors are provided, the second optical element is provided in optical path between the two reflection mirrors and, when the only one reflection mirror is provided, the second optical element is provided on the downstream side of an optical path of the reflection mirror.

13. The image forming apparatus according to claim 8, wherein, in the post-deflection optical system, a third reflection mirror which reflects, second on the upstream side of the optical paths, a luminous flux second on the downstream side in the sub-scanning direction or on the upstream side in the sub-scanning direction among the plural luminous fluxes acted on by the first optical element is provided in the optical path between the first optical element and another second optical element and a fourth reflection mirror which reflects, on the most downstream side of the optical paths, a luminous flux third on the upstream side in the sub-scanning direction or the upstream side in the sub-scanning direction among the plural luminous fluxes acted on by the first optical element is provided in the optical paths between the first optical element and another second optical element.

14. The image forming apparatus according to claim 13, wherein
- a set of two reflection mirrors and only one reflection mirrors are provided in the post-deflection optical system in accordance with the color components, and
- the fourth reflection mirror is the only one reflection mirror.

* * * * *